United States Patent
Sutton et al.

(10) Patent No.: US 11,480,685 B2
(45) Date of Patent: Oct. 25, 2022

(54) COMPACT OPTICAL PACKAGING OF LIDAR SYSTEMS USING DIFFRACTIVE STRUCTURES BEHIND ANGLED INTERFACES

(71) Applicant: Apple Inc., Cupertino, CA (US)

(72) Inventors: Andrew J. Sutton, Sunnyvale, CA (US); Michael C. Wharton, Santa Clara, CA (US); Romain A. Teil, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 424 days.

(21) Appl. No.: 16/805,888

(22) Filed: Mar. 2, 2020

(65) Prior Publication Data
US 2020/0348418 A1    Nov. 5, 2020

Related U.S. Application Data

(60) Provisional application No. 62/843,464, filed on May 5, 2019.

(51) Int. Cl.
*G01S 17/93*    (2020.01)
*G01S 7/48*    (2006.01)
(Continued)

(52) U.S. Cl.
CPC ............ *G01S 17/931* (2020.01); *G01S 7/484* (2013.01); *G01S 7/4815* (2013.01);
(Continued)

(58) Field of Classification Search
CPC ............ B60R 11/00; B60R 2011/0026; G01S 17/931; G01S 2013/93276; G01S 7/4812;
(Continued)

(56) References Cited

U.S. PATENT DOCUMENTS 3,604,804 A * 9/1971 Penney .................. G01S 17/58
356/28
5,475,670 A * 12/1995 Hamada ............... G11B 7/1353
369/103

(Continued)

FOREIGN PATENT DOCUMENTS

WO    2018090085 A1    5/2018
WO    19046895 A1    3/2019

OTHER PUBLICATIONS

Buck et al., "Polarization Gratings for Non-mechanical Beam Steering Applications", Boulder Nonlinear Systems, Inc, pp. 1-7, May 6, 2013.

*Primary Examiner* — Tyler J Lee
(74) *Attorney, Agent, or Firm* — Kligler & Associates Patent Attorneys Ltd

(57) ABSTRACT

Sensing apparatus includes a transparent window and a LiDAR assembly, including a beam source, which is configured to emit one or more beams of optical radiation along a beam axis, and which is configured to scan the one or more beams over an angular range about the beam axis. A diffractive structure is mounted approximately parallel to the transparent window and positioned to intercept the one or more beams emitted by the LiDAR assembly and turn the beam axis to pass through the transparent window at an angle greater than 30° relative to a normal to a surface of the transparent window.

20 Claims, 4 Drawing Sheets

(51) Int. Cl.
  *B60R 11/00* (2006.01)
  *G01S 17/931* (2020.01)
  *G01S 7/481* (2006.01)
  *G01S 7/484* (2006.01)

(52) U.S. Cl.
  CPC .......... *G01S 7/4816* (2013.01); *G01S 7/4817* (2013.01); *B60R 11/00* (2013.01); *B60R 2011/0026* (2013.01)

(58) Field of Classification Search
  CPC .... G01S 7/4815; G01S 7/4816; G01S 7/4817; G01S 7/484
  See application file for complete search history.

(56) References Cited

U.S. PATENT DOCUMENTS

| | | | | |
|---|---|---|---|---|
| 6,875,973 | B2 * | 4/2005 | Ortyn | G02B 27/0012 250/201.3 |
| 7,087,877 | B2 * | 8/2006 | Ortyn | G02B 27/0012 250/237 G |
| 7,532,311 | B2 * | 5/2009 | Henderson | G01S 17/89 356/28 |
| 7,688,512 | B2 * | 3/2010 | Kittaka | G01J 3/18 359/576 |
| 8,040,607 | B2 * | 10/2011 | Miller | G02B 1/11 359/569 |
| 9,684,076 | B1 * | 6/2017 | Feldkhun | G01S 17/89 |
| 10,527,727 | B2 * | 1/2020 | Bondy | G01S 17/89 |
| 10,802,184 | B2 * | 10/2020 | Greiner | G02B 5/1871 |
| 2004/0217256 | A1 * | 11/2004 | Ortyn | G02B 27/0012 250/201.4 |
| 2007/0041024 | A1 * | 2/2007 | Gao | G01D 5/28 356/616 |
| 2009/0268295 | A1 * | 10/2009 | Miller | G02B 5/1871 359/569 |
| 2017/0090031 | A1 | 3/2017 | Bondy et al. | |
| 2018/0031680 | A1 * | 2/2018 | Lee | G01S 7/481 |

7

* cited by examiner

COMPACT OPTICAL PACKAGING OF LIDAR SYSTEMS USING DIFFRACTIVE STRUCTURES BEHIND ANGLED INTERFACES

CROSS-REFERENCE TO RELATED APPLICATION

This application claims the benefit of U.S. Provisional Patent Application 62/843,464, filed May 5, 2019, which is incorporated herein by reference.

FIELD OF THE INVENTION

The present invention relates generally to systems and methods for optical sensing, and particularly to depth mapping.

BACKGROUND

Time-of-flight (ToF) imaging techniques are used in many LiDAR systems (also referred to as depth mapping, 3D mapping or 3D imaging systems). In direct ToF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

SUMMARY

Embodiments of the present invention that are described hereinbelow provide improved apparatus and methods for optical sensing, such as LiDAR-based depth sensing.

There is therefore provided, in accordance with an embodiment of the invention, sensing apparatus, including a transparent window and a LiDAR assembly, including a beam source, which is configured to emit one or more beams of optical radiation along a beam axis, and which is configured to scan the one or more beams over an angular range about the beam axis. A diffractive structure is mounted approximately parallel to the transparent window and positioned to intercept the one or more beams emitted by the LiDAR assembly and turn the beam axis to pass through the transparent window at an angle greater than 30° relative to a normal to a surface of the transparent window.

In some embodiments, the LiDAR assembly includes at least one sensor, which is configured to detect the optical radiation that is reflected from a target and returned to the at least one sensor through the transparent window. In a disclosed embodiment, the at least one sensor is positioned on the beam axis in a monostatic configuration with the beam source.

Additionally or alternatively, the beam source includes a substrate and an array of emitters, which are disposed on the substrate and are configured to emit respective beams.

In some embodiments, the LiDAR assembly includes a folding optic, such as a grating, which is positioned between the beam source and the one or more diffractive structures configured to intercept and turn the beam axis toward the transparent window. In a disclosed embodiment, the beam source is configured to tune a wavelength of the one or more beams over a predefined tuning range, and the folding optic includes a dispersive element, which is configured to deflect the one or more beams at a turning angle that varies as a function of the wavelength. Alternatively, the folding optic includes a mirror, which is configured to rotate so as to deflect the one or more beams over a range of turning angles.

In some embodiments, the diffractive structure is configured to rotate relative to the beam axis so as to scan the one or more beams passing through the transparent window over a range of beam angles. In one embodiment, the LiDAR assembly is configured to scan the one or more beams in a first scan direction, and the diffractive structure is configured to rotate so as to scan the one or more beams in a second scan direction, transverse to the first scan direction.

Typically, the diffractive structure is mounted in proximity to the transparent window. In some embodiments, the LiDAR assembly is packed into a support structure of a windshield of a vehicle, and the transparent window is the windshield or is placed in the support structure approximately parallel to the windshield.

There is also provided, in accordance with an embodiment of the invention, a method for sensing, which includes providing a LiDAR assembly, which is configured to emit one or more beams of optical radiation along a beam axis and to scan the one or more beams over an angular range about the beam axis. A diffractive structure is mounted approximately parallel to a transparent window so as to intercept the one or more beams emitted by the LiDAR assembly and turn the beam axis to pass through the transparent window at an angle greater than 30° relative to a normal to a surface of the transparent window.

The present invention will be more fully understood from the following detailed description of the embodiments thereof, taken together with the drawings in which:

DETAILED DESCRIPTION OF EMBODIMENTS

Overview

In some applications, a depth mapping device is mounted behind a steeply-inclined transparent window, with the central axis of the field of view of the device angled steeply relative to the normal to the surface of the window. For example, when a forward-looking LiDAR device is mounted behind the windshield of a car or other vehicle, the optical axis of the field of view of the device may be angled by 45° or more relative to the normal to the windshield.

Embodiments of the present invention that are described herein use diffractive structures to fold the optical axis of an optical sensing device, such as a LiDAR device, and thus facilitate compact packaging of such devices behind a steeply-inclined transparent surface. The diffractive structure in these embodiments is mounted approximately parallel to the transparent surface. (The term "approximately parallel" in the present context means that the plane of the diffractive structure is within 20° of the plane of the transparent surface; but for compact packaging, it may be more advantageous that the planes be within 10° or even 5°. For compactness, the diffractive structure is typically mounted in proximity to the transparent window, meaning that the distance between the diffractive structure and the window is less that a transverse dimension of the diffractive structure (meaning a dimension measured in a direction parallel to the window); but alternatively, the diffractive structure may be positioned at a greater distance from the window. Any suitable type of diffractive structure may be used in this context, such as a surface grating, polarization grating, or volume holographic grating.

The LiDAR assembly, comprising a beam source and optics mounted behind the transparent window, directs one or more beams of optical radiation through the diffractive structure, which then turns the beams to pass through the transparent window in the desired direction. In other words, the diffractive structure turns the beam axis along which the beams are propagating so that the axis passes through the window at a high angle, for example at an angle more than 30° from a normal to the surface of the window, and possibly more than 45°.

In some of the embodiments that are described below, the LiDAR beam source scans the beam or beams in a first direction, while the diffractive structure is rotated to scan the beam or beams in a second direction, transverse to the first direction, across the field of view. In one such embodiment, the scan in the first direction is accomplished by scanning the wavelength of a laser beam (or beams), and using dispersive elements, such as a grating and/or prism, to convert the wavelength scan into an angular scan. In another embodiment, an opto-mechanical scanner, such as a scanning mirror, is used to scan a laser beam in at least the first direction.

Grating-Based Scanning

Figure 1:
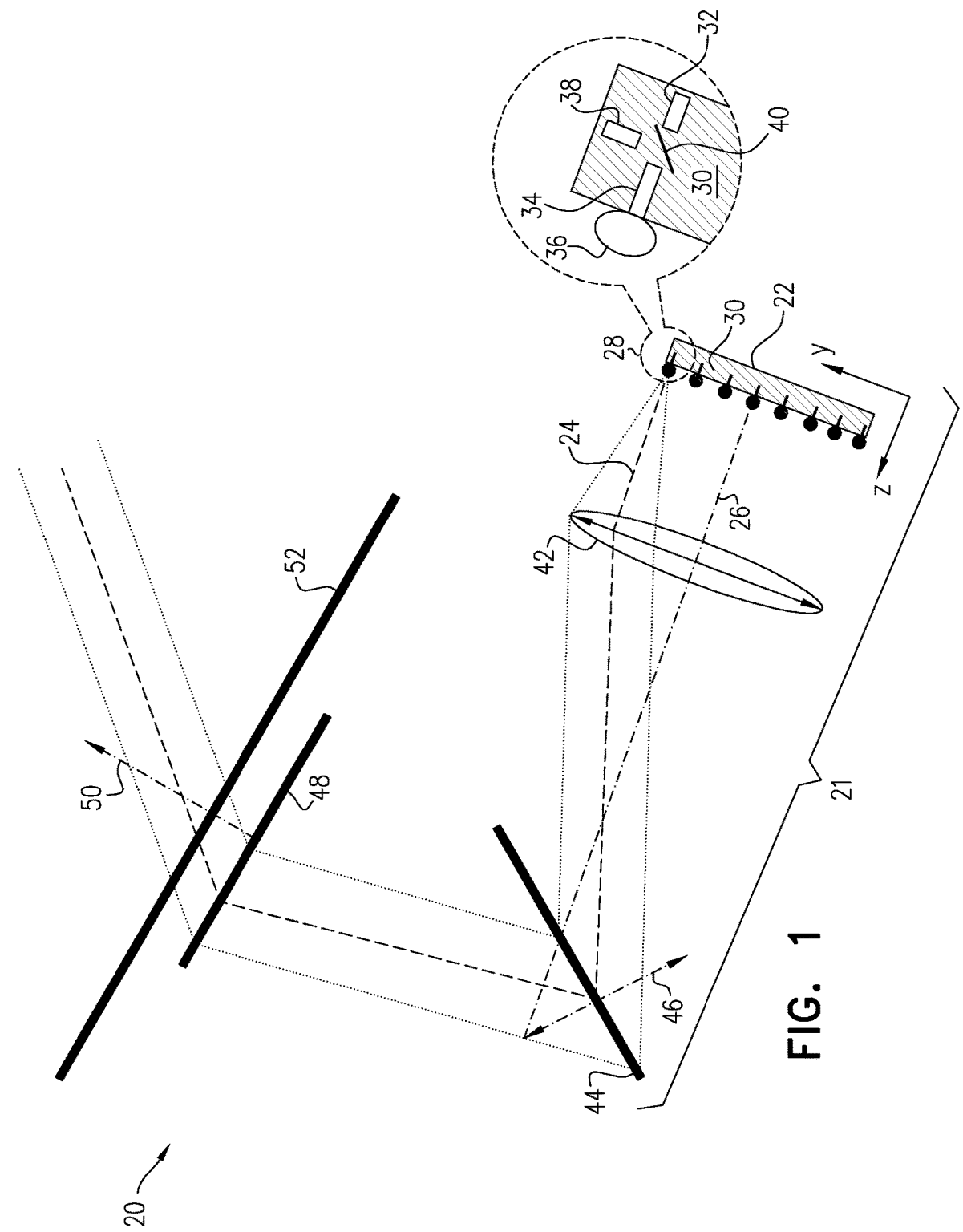
FIG. 1 is a schematic side view of apparatus for depth sensing, in accordance with an embodiment of the invention.

FIG. 1 is a schematic side view of apparatus 20 for depth sensing, in accordance with an embodiment of the invention. Apparatus 20 is particularly (although not exclusively) adapted for mounting behind a transparent window 52, such as the windshield of an automobile or other vehicle.

Apparatus 20 comprises a LiDAR assembly 21, comprising a beam source 22, which emits beams 24 of optical radiation along a beam axis 26. The beam source may in general comprise one or more emitters. In the embodiment shown in FIG. 1, beam source 22 comprises an array of LiDAR sensors 28, disposed on a substrate 30, such as a silicon substrate. Each sensor 28 comprises an emitter 32, such as a pulsed laser diode, and a detector 38, such as a single-photon avalanche diode (SPAD) or other type of ToF sensing device. In this embodiment, emitters 32 and detectors 38 are mounted in a monostatic configuration, sharing the same aperture and beam axis. A beamsplitter 40 separates the outgoing (transmitted) and incoming (received) light, for example on the basis of polarization or optical non-reciprocity, as is known in the art.

In the pictured embodiment, LiDAR sensors 28 comprise photonic integrated circuits, including respective emitters 32 and detectors 38, with shared input/output couplers 34. This coupler 34 may comprise, for example, a single-mode or double-clad optical fiber, which may be aligned in a V-groove on substrate 30, thus precisely defining the aperture of sensor 28. Additionally or alternatively, coupler 34 may comprise a waveguide configured as a spot-size converter with an edge or vertical coupling structure, as described, for example, in U.S. patent application Ser. No. 16/752,773, filed Jan. 27, 2020, whose disclosure is incorporated herein by reference. The spot size and divergence of the output beams may be controlled, for example, by tapering the waveguides, as well as by means of a microlens 36 positioned in alignment with each of the beams.

The apertures defined by couplers 34 may be located in a common plane, or they may alternatively be disposed along a curve, as part of the overall optical design of LiDAR assembly 21. Couplers 34 and microlenses 36 may be oriented so as to emit beams 24 in a direction normal to the edge of substrate 30, or alternatively in non-normal directions, for example at respective angles that converge toward a focal plane. These sorts of arrangements of the apertures and beam directions add flexibility in the design of the LiDAR optics, as explained further on pages 9-24 in the above-mentioned U.S. patent application Ser. No. 16/722, 773.

Collimating optics 42 in LiDAR assembly 21 map the positions of the apertures of sensors 28 to angles, as illustrated in FIG. 1. These angles are typically sparsely distributed, meaning that there are angular gaps between the collimated beams that are not covered by the areas of the beams. Although collimating optics 42 are shown in the figure, for the sake of simplicity, as a single lens, in practice the collimating optics typically include multiple lens elements, as well as microlenses 36.

A folding optic 44 is positioned between beam source 22 and window 52, and serves to intercept and turn beam axis 26 toward the window. In the present embodiment, folding optic 44 comprises a diffractive element, such as a grating, which is blazed so as to direct beams 24 into a specific, target diffraction order relative to a normal 46 to the grating surface. Folding optic 44 is useful in enabling compact packaging of LiDAR assembly 21 by reducing the physical dimension of the LiDAR assembly in the direction normal to window 52.

Furthermore, in addition to redirecting beam axis 26, the grating in folding optic 44 can also be used in scanning the angles of beams 24 over a certain range about the beam axis. Specifically, the grating introduces wavelength-dependent angular dispersion (initial dispersion). To scan the beams, beam source 22 tunes the wavelengths of the beams over a predefined tuning range, for example over a range of 40-60 nm, using techniques of micromechanical or thermal wavelength tuning that are known in the art. The turning angle of the grating inherently varies as a function of the wavelength, so that scanning the wavelengths causes folding optic 44 to scan the deflection angles of beams 24. Alternatively or additionally, folding optic 44 may comprise other sorts of dispersive optical elements, such as a prism. The range of angular scanning by folding optic 44 may or may not be sufficient to fill in the angular gaps between beams 24, meaning that the area covered by the beams may or may not remain sparse.

Another diffractive structure, such as a grating 48, is mounted approximately parallel to window 52 (and possibly precisely parallel, as shown in FIG. 1). As noted earlier, grating 48 may comprise any suitable sort of diffractive structure that is known in the art, such as a surface grating, polarization grating, or volume holographic grating. Grating 48 is positioned to receive and intercept beams 24 output from folding optic 44 and turn beam axis 26 to pass through transparent window 52 at an angle greater than 30° relative to a normal to the surface of the window. Grating 48 is designed and patterned so as to have a range of acceptance angles large enough to accommodate all of beams 24, while diffracting beams 24 preferentially into a diffraction order that is directed toward the desired field of view. Thus, in the vehicular example noted above, grating 48 will typically deflect the beams in a forward direction, notwithstanding the slant of the windshield.

In addition, in the present embodiment, grating 48 is mounted and driven to rotate relative to an axis 50 (which is parallel to beam axis 26 in the present case). As grating 48 rotates, rotation of the grating lines cause the diffraction angle at which beams 24 are deflected to scan in an azimuthal direction about axis 50. The scanned beams thus pass through window 52 over a range of beam angles and scan across the field of view of apparatus 20. By combining the angular scanning induced by rotation of grating 48 with the wavelength-tuned scanning of folding optic 44, the overall scan range of apparatus 20 is able to densely cover the field of view. In other words, every output angle within the field of view of apparatus 20 can be addressed by an appropriate combination of beam selection, wavelength tuning and grating rotation. This sort of scanning performance can be achieved, for example, by arranging LiDAR assembly 21 to scan beams 24 in a first scan direction (such as a scan direction within the plane of the page in FIG. 1), while the rotation of grating 48 scans the beams in a second scan direction, transverse to the first scan direction (such as the X-direction, perpendicular to the page in FIG. 1).

Figure 2:
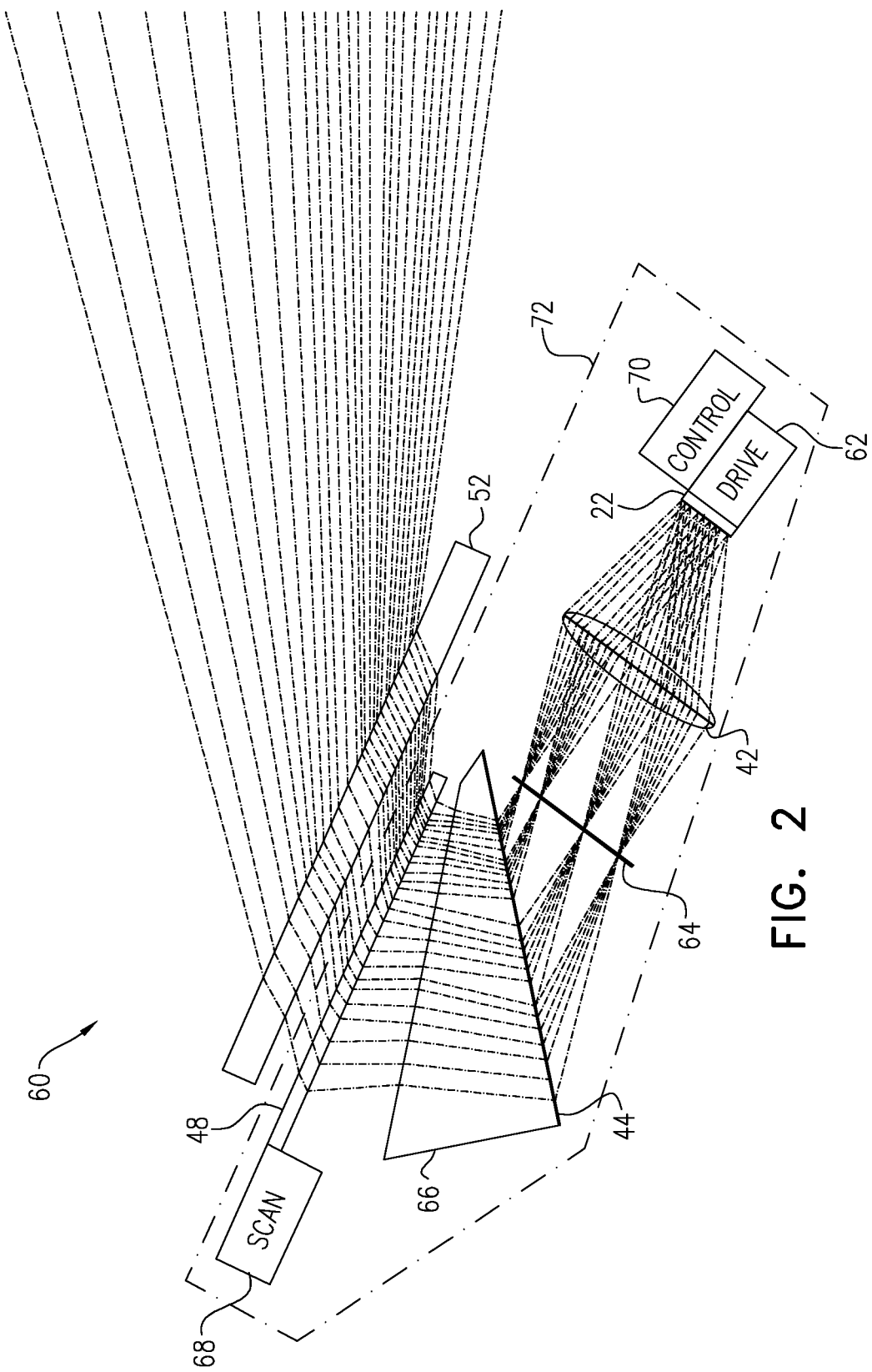
FIG. 2 is a schematic side view of apparatus for depth sensing, in accordance with another embodiment of the invention.

FIG. 2 is a schematic side view of apparatus 60 for depth sensing, in accordance with another embodiment of the invention. The principles of operation of apparatus 60 are very similar to those of apparatus 20, and the same indicator numbers are used to refer to corresponding components in the two embodiments.

As shown in FIG. 2, drive circuits 62 control the operation of beam source 22, including tuning the wavelengths of beams 24 and sensing the times of flight of photons received by detectors 38. Typically, drive circuits 62 comprise current pulse generators and voltage sources suitable for actuating and tuning emitters 32, along with amplification and time/digital conversion circuits for processing the outputs of detectors 38. Collimating optics 42 direct the beams through a pupil 64, toward folding optic 44, which in this example comprises a prism 66 with a surface grating on its entrance surface. A scan drive 68, typically comprising a suitable electric motor, rotates grating 48 so as to scan the beams of apparatus 60 across the field of view. A controller 70, such as a programmable microprocessor or microcontroller with suitable interfaces, regulates the operation of drive circuits 62 and scan drive 68 in order to scan beams 24 over the field of view, and processes signals output by the drive circuits in order to generate a depth map of the field of view.

All the elements of apparatus 60 are contained inside a compact housing 72, which extends mainly along a direction parallel to window 52. Assuming window 52 to be the windshield of a vehicle, LiDAR assembly 21 can be packed in this manner into a support structure of the windshield. Alternatively, window 52 may be separate from the windshield and may be placed, for example, in a suitable opening in the support structure, typically in an orientation that is approximately parallel to the windshield of the vehicle.

Figure 3:
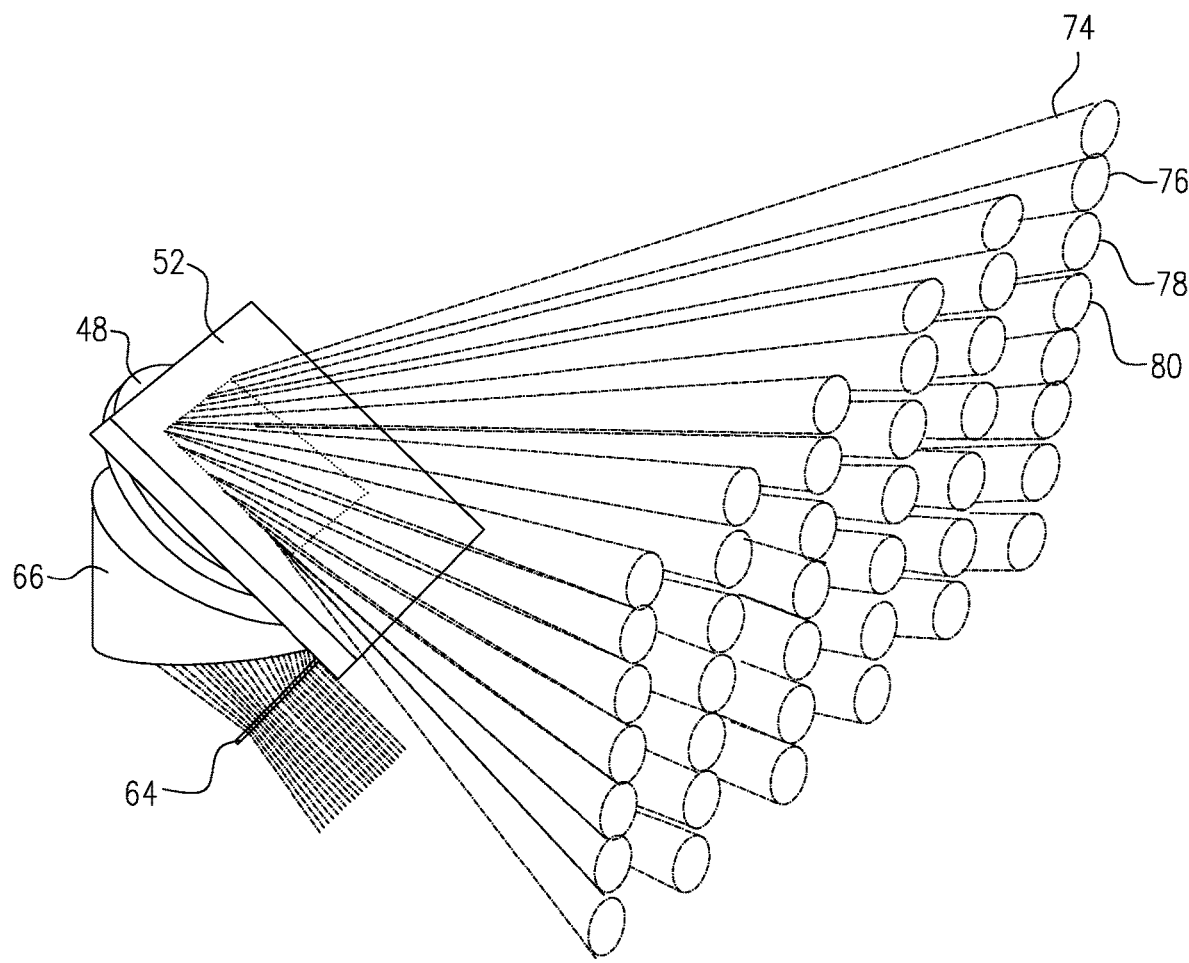
FIG. 3 is a schematic pictorial illustration of rays output by the apparatus of FIG. 2, in accordance with an embodiment of the invention.

FIG. 3 is a schematic pictorial illustration of rays 74, 76, 78, 80, . . . , which are output by apparatus 60, in accordance with an embodiment of the invention. The different elevation angles of rays 74, 76, 78, 80, . . . , relative to window 52 can be generated, for example, by scanning the wavelength of emitters 32. Each vertical column of rays 74, 76, 78, 80, . . . , is thus produced by the beam 24 that is output from a corresponding emitter 32 in beam source 22. Rotation of grating 48 about its axis shifts the columns of rays in the azimuthal direction, i.e., a direction transverse to the vertical axes of the columns, and thus fills in the gaps between the columns to give dense coverage of the field of view of the apparatus.

Mirror-Based Scanning

Figure 4:
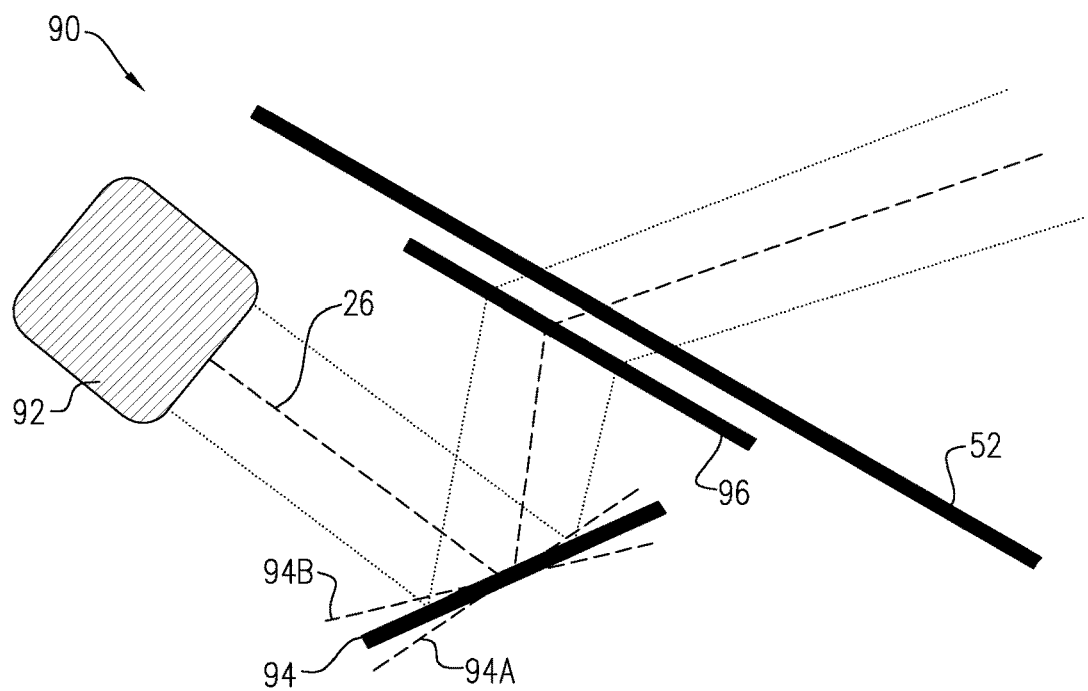
FIG. 4 is a schematic side view of apparatus for depth sensing, in accordance with an alternative embodiment of the invention.

FIG. 4 is a schematic side view of apparatus 90 for depth sensing, in accordance with an alternative embodiment of the invention. The elements of apparatus 90 are similar to the preceding embodiments, except that the folding optic in the present embodiment comprises a mirror 94, which is configured to rotate so as to deflect the beams over a range of turning angles, in either one or two dimensions.

Apparatus 90 comprises a beam source 92, which is generally similar in construction and operation to beam source 22 and collimation optics 42 in FIG. 1. In the present embodiment, however, mirror 94 both turns and scans the beams output by beam source 92, so that wavelength scanning of the beam source is not required. Therefore, beam source 92 typically comprises one or more laser diodes operating at a constant wavelength (for example 1545 nm), and a narrow linewidth, generally less than 1 nm.

Mirror 94 is attached to a scanning mechanism (not shown in the figures), such as a galvanometer drive or a micro-electro-mechanical systems (MEMS) drive, or any other suitable sort of scanning mechanism known in the art, which drives the mirror to scan in one or two dimensions. In the pictured example, mirror 94 rotates about an axis perpendicular to the page of FIG. 4, between orientations 94A and 94B, and thus scans the elevation of the beams exiting through window 52. As in the preceding embodiment, a grating 96 turns beam axis 26 to pass through window 52 at a high angle, and also rotates so as to scan the beams over a desired range in the azimuthal direction.

In an alternative embodiment, in which mirror 94 is able to scan in two dimensions, grating 96 may be static, so as to turn the beam axis without any additional scanning function.

Figure 5:
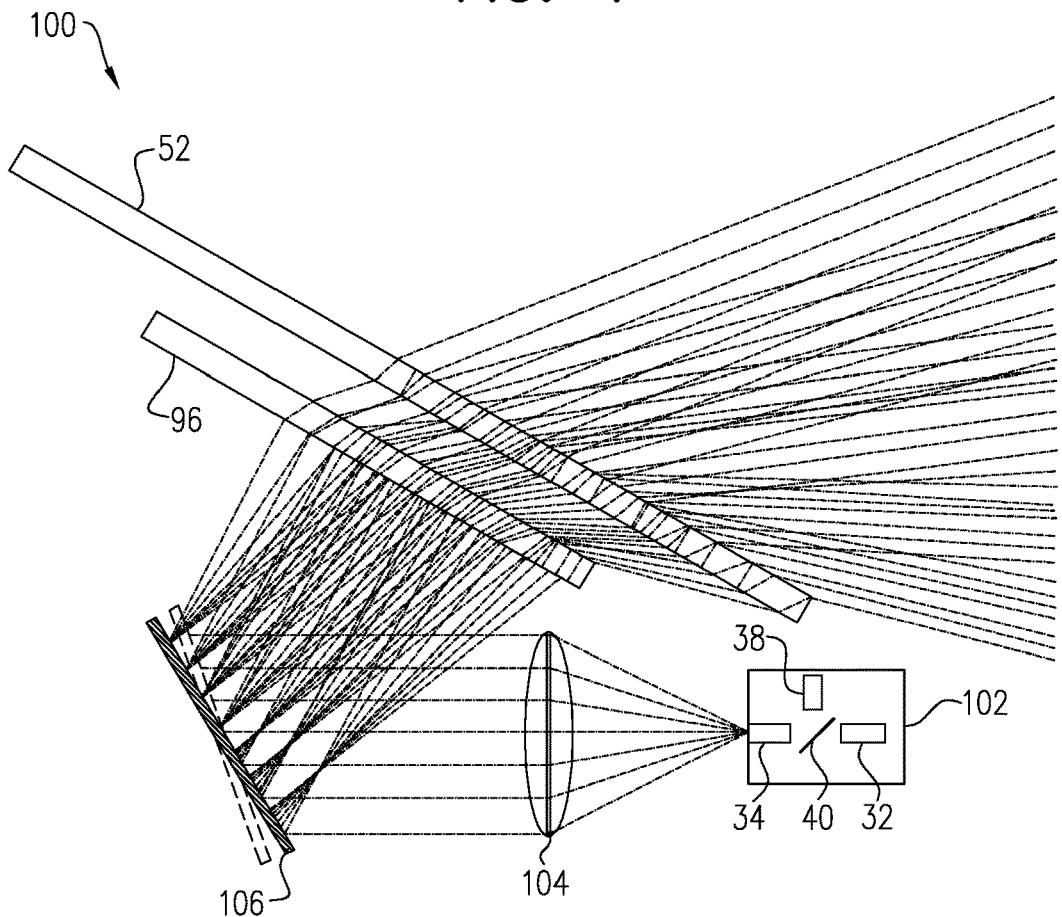
FIG. 5 is a schematic side view of apparatus for depth sensing, in accordance with yet another embodiment of the invention.

FIG. 5 is a schematic side view of apparatus 100 for depth sensing, in accordance with yet another embodiment of the invention. Apparatus 100 comprises a monostatic beam source 102, comprising emitter 32 and detector 38 as in the embodiment of FIG. 1. Collimating optics 104 direct the beam or beams output by beam source 102 toward a scanning mirror 106, which rotates so as to scan the elevation of the beams. Transverse scanning is carried out by rotation of grating 96.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Sensing apparatus, comprising:
  a transparent window;
  a LiDAR assembly, comprising a beam source, which is
    configured to emit one or more beams of optical radiation along a beam axis, and which is configured to scan the one or more beams over an angular range about the beam axis; and a diffractive structure mounted approximately parallel to the transparent window and positioned to intercept the one or more beams emitted by the LiDAR assembly and turn the beam axis to pass through the transparent window at an angle greater than 30° relative to a normal to a surface of the transparent window.

2. The apparatus according to claim 1, wherein the LiDAR assembly comprises at least one sensor, which is configured to detect the optical radiation that is reflected from a target and returned to the at least one sensor through the transparent window.

3. The apparatus according to claim 2, wherein the at least one sensor is positioned on the beam axis in a monostatic configuration with the beam source.

4. The apparatus according to claim 1, wherein the beam source comprises a substrate and an array of emitters, which are disposed on the substrate and are configured to emit respective beams.

5. The apparatus according to claim 1, wherein the LiDAR assembly comprises a folding optic, which is positioned between the beam source and the one or more diffractive structures configured to intercept and turn the beam axis toward the transparent window.

6. The apparatus according to claim 5, wherein the folding optic comprises a grating.

7. The apparatus according to claim 5, wherein the beam source is configured to tune a wavelength of the one or more beams over a predefined tuning range, and wherein the folding optic comprises a dispersive element, which is configured to deflect the one or more beams at a turning angle that varies as a function of the wavelength.

8. The apparatus according to claim 5, wherein the folding optic comprises a mirror, which is configured to rotate so as to deflect the one or more beams over a range of turning angles.

9. The apparatus according to claim 1, wherein the diffractive structure is configured to rotate relative to the beam axis so as to scan the one or more beams passing through the transparent window over a range of beam angles.

10. The apparatus according to claim 9, wherein the LiDAR assembly is configured to scan the one or more beams in a first scan direction, and the diffractive structure is configured to rotate so as to scan the one or more beams in a second scan direction, transverse to the first scan direction.

11. The apparatus according to claim 1, wherein the diffractive structure is mounted in proximity to the transparent window.

12. The apparatus according to claim 11, wherein the LiDAR assembly is packed into a support structure of a windshield of a vehicle, and the transparent window is the windshield or is placed in the support structure approximately parallel to the windshield.

13. A method for sensing, comprising:

providing a LiDAR assembly, which is configured to emit one or more beams of optical radiation along a beam axis and to scan the one or more beams over an angular range about the beam axis; and mounting a diffractive structure approximately parallel to a transparent window so as to intercept the one or more beams emitted by the LiDAR assembly and turn the beam axis to pass through the transparent window at an angle greater than 30° relative to a normal to a surface of the transparent window.

14. The method according to claim 13, wherein providing the LiDAR assembly comprises positioning at least one sensor to detect the optical radiation that is reflected from a target and returned to the at least one sensor through the transparent window.

15. The method according to claim 13, wherein providing the LiDAR assembly comprises positioning a folding optic, between a beam source in the LiDAR assembly and the one or more diffractive structures so as to intercept and turn the beam axis toward the transparent window.

16. The method according to claim 15, wherein providing the folding optic comprises tuning a wavelength of the one or more beams over a predefined tuning range, wherein the folding optic comprises a dispersive element, which is configured to deflect the one or more beams at a turning angle that varies as a function of the wavelength.

17. The method according to claim 15, wherein the folding optic comprises a mirror, which is configured to rotate so as to deflect the one or more beams over a range of turning angles.

18. The method according to claim 13, wherein mounting the diffractive structure comprises rotating the diffractive structure relative to the beam axis so as to scan the one or more beams passing through the transparent window over a range of beam angles.

19. The method according to claim 18, wherein the LiDAR assembly is configured to scan the one or more beams in a first scan direction, and rotating the diffractive structure scans the one or more beams in a second scan direction, transverse to the first scan direction.

20. The method according to claim 13, wherein the diffractive structure is mounted in proximity to the transparent window, and wherein providing the LiDAR assembly comprises packing the LiDAR assembly into a support structure of the windshield.

* * * * *